United States Patent Office 3,519,098
Patented July 7, 1970

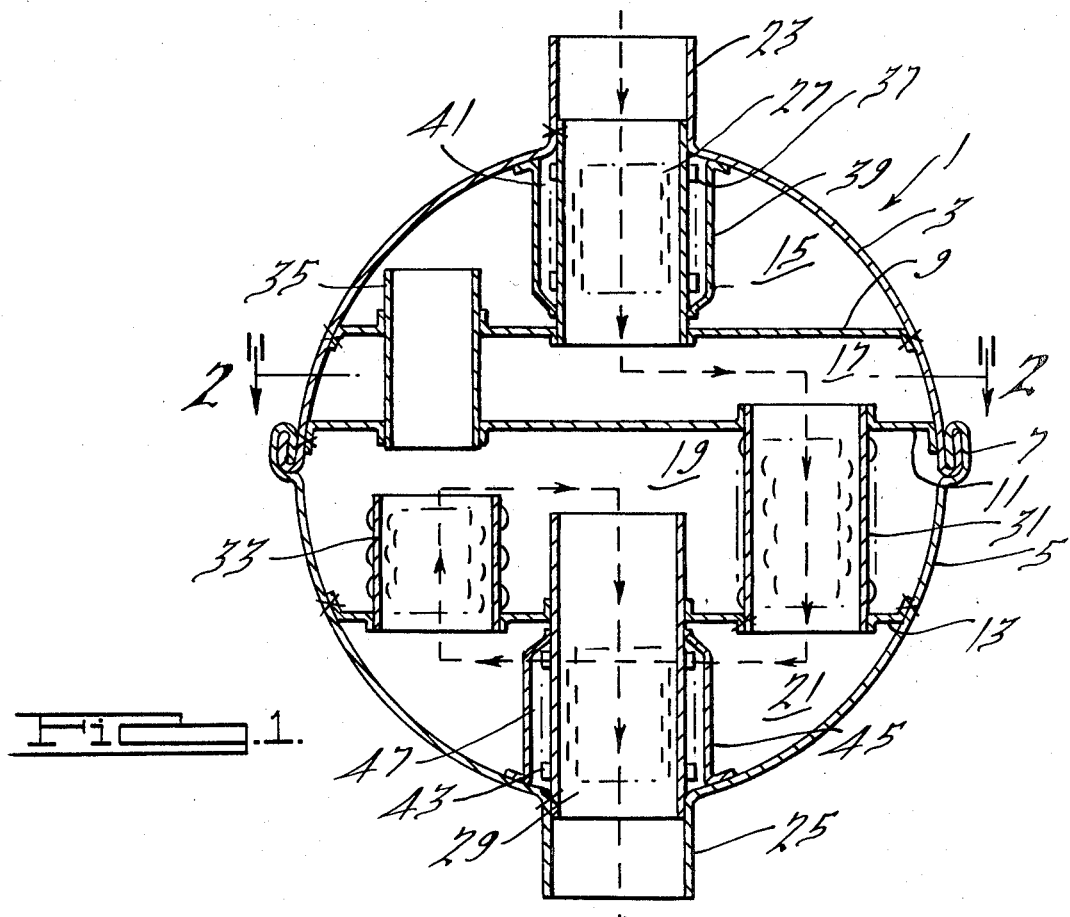

3,519,098
SPHERICAL MUFFLER
Charles I. Plaga, Jr., Michigan Center, Mich., assignor, by mesne assignments, to Tenneco Inc., Houston, Tex., a corporation of Delaware
Filed Mar. 20, 1969, Ser. No. 808,737
Int. Cl. F01n 1/08, 7/00
U.S. Cl. 181—57                            3 Claims

ABSTRACT OF THE DISCLOSURE

A muffler having a spherical outer shell with internal silencing structure eliminates parts and fits in space available beneath an automobile as well as provides improved silencing.

BRIEF SUMMARY OF THE INVENTION

The invention comprises a muffler suitable for automotive and other usage wherein gas flow tubes and other silencing structure are housed within a substantially spherical outer shell.

ADVANTAGES OF THE INVENTION

Conventional automotive mufflers are usually tubular in shape with an oval cross section, a series of internal gas passage tubes, and a series of internal partitions and end headers secured to the tubular outer shell. In addition, because of the oil canning or drumming effect obtained by vibration of the outer shell a layer of asbestos and a cover are usually used around the outer shell.

It has been found that a muffler of spherical outer shell construction and comparable internal silencing structure is superior to a corresponding conventional muffler of the type just described in roughness control, air rush control, and overall performance. It can use smaller internal tubes at the same backpressure and the asbestos and outer cover can be eliminated. Additionally, the two end headers can be elminated since the spherical housing can be made of two spherical sections connected together. Thus, as compared with mufflers that are functionally competitive, a spherical type muffler according to the invention involves fewer parts, better performance, and accommodation to space that will not receive a conventional muffler, such as the wheel well or a portion of the trunk of an automobile.

DESCRIPTION OF THE DRAWINGS

FIG. 1 is an axial cross section of a muffler embodying the invention; and

FIG. 2 is a cross section along the line 2—2 of FIG. 1.

DETAILED DESCRIPTION OF THE INVENTION

The muffler 1 has an outer housing which comprises a first semi-spherical section 3 and a second semi-spherical section 5. The sections 3 and 5 are interconnected in a gas tight joint 7 which may be a welded joint or a mechanical interlock between flanges on the respective shells or other joining technique known to those skilled in the art. Three parallel partitions 9, 11, and 13 extend across the width of the spherical shell and have flanges which are spot-welded to the shell sections as indicated by the X's in the drawing. The partitions 9, 11, and 13 act with shell sections 3 and 5 and with each other to define internal chambers 15, 17, 19, and 21. The shell section 3 has an inlet bushing 23 which may be integral with the rest of the shell or may be an attached tubular part; and the shell 5 has an outlet bushing 25 which also may be integral or an attached part. In the embodiment shown, the inlet and outlet bushings are diametrically opposite to each other and axially aligned. However, one additional advantage of the spherical construction is that the bushings 23 and 25 may be readily disposed at various angles to each other with little or no interference with the internal construction.

A perforated or louvered gas flow tube 27 is secured in the inlet 23 and in a suitable flange in the partition 9. An outlet tube 29 is supported in the outlet bushing 25, extends through a suitable support flange in the partition 13, and terminates approximately midway between the partitions 11 and 13 within the chamber 19. An intermediate flow tube 31 is supported in suitable flanges in the partitions 11 and 13 and provides a gas flow connection between chambers 17 and 21. A reverse flow tube 33 is supported in a suitable flange in the partition 13 and provides a gas flow connection between the chamber 21 and an intermediate part of the chamber 19 at a point displaced laterally from the inlet to the tube 29 and on the opposite side of the outlet tube from the intermediate tube 31.

An imperforate tuning tube is supported in suitable flanges in the partitions 9 and 11, preferably in alignment with the tube 33, and extends into and opens into the chamber 15. It forms the only inlet and outlet to the space within chamber 15 and therefore acts with it to form a Helmholtz resonator structure that may be tuned to attenuate a desired frequency by means of the Helmholtz formula.

Preferably the inlet tube 27 is louvered as indicated at 37 and surrounded by a shell 39 to form a closed chamber 41 that communicates with gas flowing through the tube by means of the louvers whereby the chamber acts as a spit chamber to attenuate high frequencies and roughness. Similarly, the outlet flow tube 29 has a patch of louvers 43 which is surrounded by a shell 45 to form a chamber 47 that acts with the louvers as a spit chamber attenuating high frequencies and roughness. The chambers 41 and 47 are preferably of somewhat different volumes so that the frequency ranges to which they most efficiently respond are somewhat different. The tubes 31 and 33 are preferably louvered throughout their lengths to provide for lateral gas flow or cross bleeding between the inside of the tubes and the chamber 19.

As indicated by the arrowheads and dashed lines, exhaust gas enters the muffler 1 through the inlet bushing 23 and flows through the inlet tube 37 where some high frequencies are attenuated by means of the spit chamber 41. Gas leaving the tube 27 enters the cross and expansion chamber 17 and flows into the intermediate tube 31 to flow into the end chamber 21, some gas cross bleeding through the louvers in tube 31 into the chamber 19. Gas leaves chamber 21 by reversing its flow to enter the tube 33 and then reach chamber 19 by passing out the end of the tube or through the louvers covering the side walls thereof. From chamber 19 the gas can flow directly to the outlet 25, being subjected to high frequency attenuation by the spit chamber 47. The gas and sound is subjected within the muffler to the action of the Helmholtz arrangement comprising chamber 15 and tube 35 which are arranged to eliminate a desired frequency which is usually in a relatively low range.

The spherical nature of the shell provided by the interconnected sections 3 and 5 is strong and resists oil canning and drumming so that tests to date reveal that it is as quiet as a tubular oval shell that is covered with asbestos and a sheet metal cover. The test results to date also show that the spherical shape can use smaller internal tubes than a corresponding conventional muffler at the same horsepower loss and backpressure while obtaining superior roughness and air rush control and overall performance. Making the internal tubes the same size as a comparable conventional muffler will still give a superior performance and provide increased engine horsepower as compared with a conventional tubular oval muffler of the same volume.

I claim:
1. A muffler for attenuating sound in flowing gas comprising a shell having an inlet and an outlet and internal gas flow tubes and silencing structure connecting the inlet and outlet and attenuating sound enroute and characterized by the shape of the shell which is substantially spherical.

2. A muffler as set forth in claim 1 including partition means subdividing the interior of said spherical shell into chambers, said tubes being mounted in said partition means and conducting gas from said inlet to said outlet through certain of said chambers.

3. A muffler as set forth in claim 2 wherein certain of said tubes act with certain of said chambers to provide Helmholtz resonators.

References Cited

UNITED STATES PATENTS

| 1,822,990 | 9/1931 | Gorsline. |
| 2,074,932 | 3/1937 | Mittendorf et al. |
| 2,928,491 | 3/1960 | Crouch. |

FOREIGN PATENTS

| 529,500 | 9/1921 | France. |
| 992,706 | 7/1951 | France. |
| 555,464 | 1/1957 | Italy. |

ROBERT S. WARD, Jr., Primary Examiner

U.S. Cl. X.R.

181—54, 61